United States Patent [19]

Stephenson et al.

[11] Patent Number: 5,212,752
[45] Date of Patent: May 18, 1993

[54] OPTICAL FIBER FERRULE CONNECTOR HAVING ENHANCED PROVISIONS FOR TUNING

[75] Inventors: Daniel L. Stephenson, Norcross; Naif T. Subh, Lawrenceville; Ruben Travieso, Alpharetta, all of Ga.

[73] Assignee: AT&T Bell Laboratories, Murray Hill, N.J.

[21] Appl. No.: 889,203

[22] Filed: May 27, 1992

[51] Int. Cl.⁵ .......................... G02B 6/26; G02B 6/38
[52] U.S. Cl. ...................................... 385/78; 385/56; 385/67; 385/76; 385/84; 385/139
[58] Field of Search ............... 385/53, 55, 56, 60, 385/66, 67, 76, 77, 78, 81, 84, 139

[56] References Cited

U.S. PATENT DOCUMENTS

| | | | |
|---|---|---|---|
| 4,146,300 | 3/1979 | Kaiser | 385/67 X |
| 4,239,333 | 12/1980 | Dakss et al. | 385/67 X |
| 4,553,814 | 11/1985 | Bahl et al. | 385/78 X |
| 4,634,214 | 1/1987 | Cannon, Jr. et al. | 385/84 X |
| 4,738,507 | 4/1988 | Palmquist | 385/78 X |
| 4,738,508 | 4/1988 | Palmquist | 385/78 X |
| 4,804,244 | 2/1989 | Hasegawa et al. | 385/84 X |
| 4,856,865 | 8/1989 | Lee | 385/67 X |
| 4,880,291 | 11/1989 | Aberson, Jr. et al. | 385/55 X |
| 4,881,792 | 11/1989 | Alameel et al. | 385/56 |
| 5,016,968 | 5/1991 | Hammond et al. | 385/78 X |
| 5,016,970 | 5/1991 | Nagase et al. | 385/78 X |
| 5,073,042 | 12/1991 | Mulholland et al. | 385/56 |
| 5,123,071 | 6/1992 | Mulholland et al. | 385/53 |

*Primary Examiner*—Brian Healy
*Attorney, Agent, or Firm*—Edward W. Somers; Donald E. Hayes, Jr.

[57] ABSTRACT

An optical connector (20) includes a ferrule assembly (22) which is adapted to be received in a plug frame (70). The ferrule assembly is held in the plug frame by a cable retention assembly (40) which is adapted to be secured to said plug frame. A leading end of the plug frame is symmetrical in an end cross-section which is normal to a longitudinal axis of the connector. After the ferrule assembly has been assembled to the plug frame, the direction of any eccentricity of the plug passageway or of an optical fiber terminated by the ferrule assembly is determined. Then the plug frame is assembled to a housing of a grip (90) such that the direction of eccentricity is aligned with a key (92) of the grip. The plug frame is capable of being assembled to the grip notwithstanding the rotational orientation of the plug frame with respect to the grip. An optical connection between optical fibers terminated by two connectors is made by inserting the grip of each of the two connectors into a coupling housing (100) so that the keys are aligned. Advantageously, portions of the connector may be factory assembled which facilitates field use of the connector to terminate optical fiber.

25 Claims, 6 Drawing Sheets

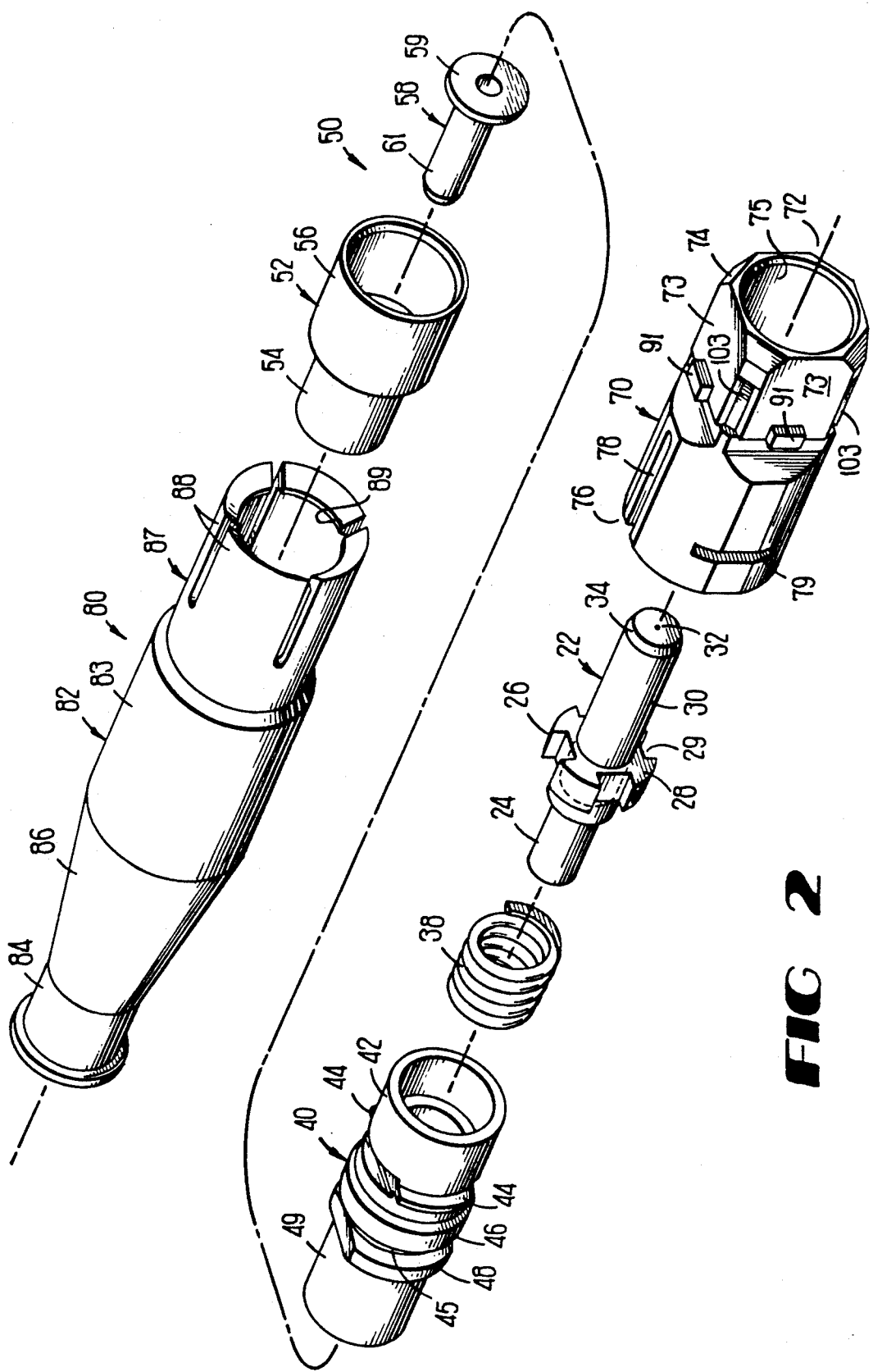

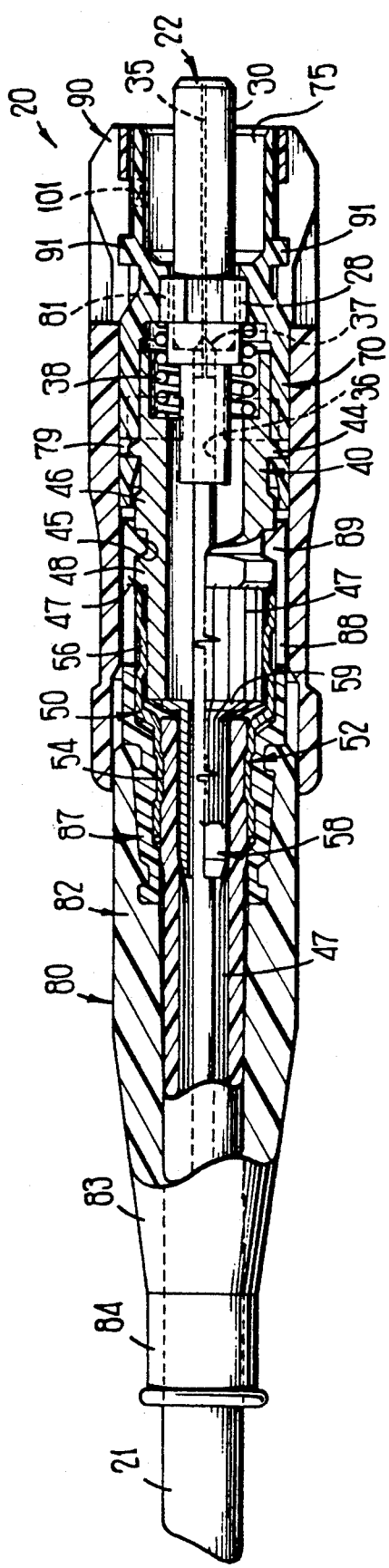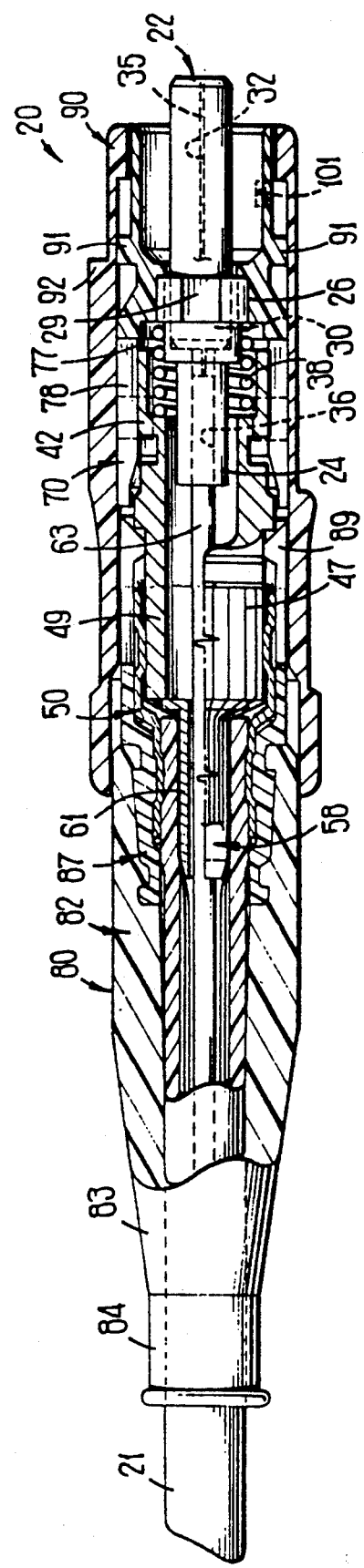

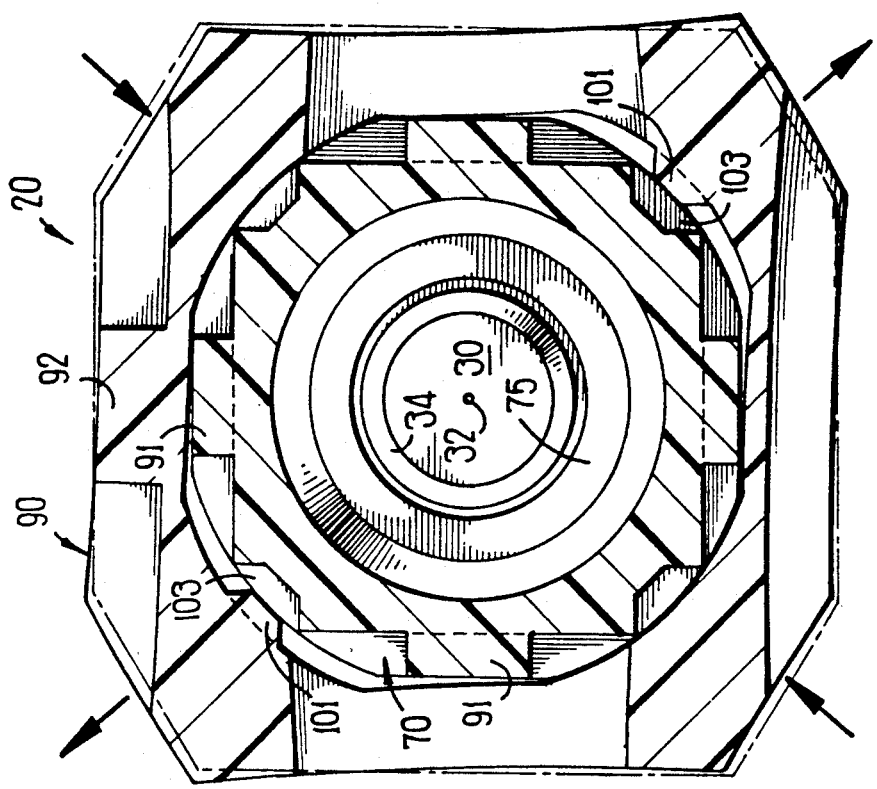
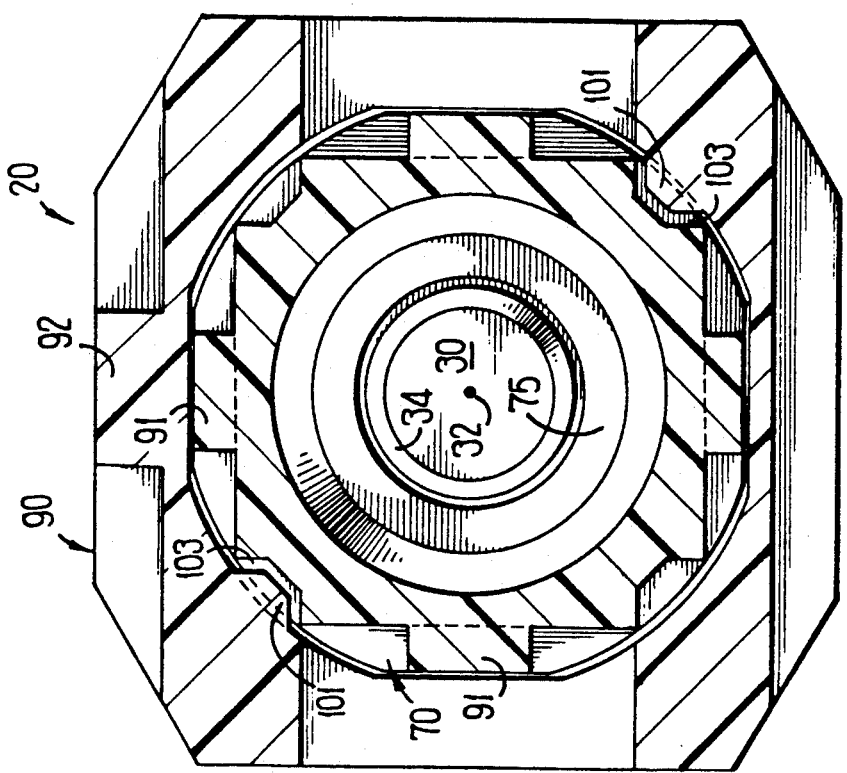

OPTICAL FIBER FERRULE CONNECTOR HAVING ENHANCED PROVISIONS FOR TUNING

TECHNICAL FIELD

This invention relates to an optical fiber ferrule connector having enhanced provisions for tuning. More particularly, the invention relates to an SC connector which includes enhanced provisions for tuning eccentricity of an optical fiber core or fiber-receiving passageway in the ferrule.

BACKGROUND OF THE INVENTION

Optical fiber connectors and splices are an essential part of optical fiber communications systems. Connectors may be used to join lengths of optical fiber into longer lengths, or to connect optical fiber to active devices such as radiation sources, detectors, or repeaters, or to passive devices such as switches or attenuators.

An optical fiber connector must meet at least two requirements. It must couple or join two optical fibers with minimum insertion loss. Secondly, it must provide mechanical stability and protection to the junction between the optical fibers in the working environment. Achieving low insertion loss in coupling two optical fibers in generally a function of the alignment of the optical fiber ends, the width of the gap between the ends, and the optical surface condition of the ends. Stability and junction protection is generally a function of connector design, such as, for example, the minimization of differential thermal expansion effects.

Many approaches to achieving fiber alignment can be found in the prior art. Among them are V-grooves, resilient ferrules, and conical bushings. A discussion of prior art connectors is provided in R. Schultz, *Proceedings of the Optical Fiber Conference*, Los Angeles (September 1982), pp. 165–170.

Some prior art optical fiber connectors contain one or more precision-machined parts and therefore are relatively costly items. Whereas this may be acceptable for some applications, in other cases the cost of such prior art connectors might constitute a significant fraction of the total installation cost. Thus, strong incentives exist for providing optical fiber connectors that do not require expensive precision-machined parts.

A further consideration in connector design is the relative ease of field installation of the connector. It is desirable that a sought-after connector be capable of being installed within a relatively short period of time without requiring special skills or manipulations not easily carried out in the field. Further, it is desired that an optical fiber connector be capable of field-terminating a length of optical fiber.

A prior art connector which has many of the above-listed desirable features includes two drawn glass cylindrical plugs or ferrules, with a fiber end portion inserted into a close-fitting passageway of each ferrule, and the connection between the two fiber ends made by inserting the ferrules in end-to-end fashion into an alignment sleeve that maintains the outer surfaces of the two ferrule in registry. This connector design relies on the capability of producing ferrules to very close tolerances by drawing them from a glass preform. Relative rotation of the two ferrules typically changes the relative position of the fibers held within the passageway because of the eccentricity of the optical fiber core with respect to the ferrule. Eccentricity is defined as the distance between the longitudinal centroidal axis of the ferrule at an end face of the ferrule and the centroidal axis of the optical fiber core held within the passageway of the ferrule. Generally, the passageway is not concentric with the outer cylindrical surface which is the reference surface. Also, the optical fiber may not be centered within the ferrule passageway and the fiber core may not be concentric with the outer surface of the fiber. Hence, the eccentricity is comprised of the eccentricity of the optical fiber within the ferrule passageway and the eccentricity of the passageway within the ferrule.

Because it is very difficult to control the eccentricity of the optical fiber core in the ferrule in which it is terminated, it is difficult to achieve desired losses of 0.1 dB or less in single mode fibers without maintaining close tolerances so that the opposed cores are aligned to within about 0.7 $\mu$m. This, of course, increases manufacturing costs.

If the total eccentricities of the two optical fiber ends to be joined are identical or at least very nearly so, then a low-loss connection can be achieved by merely rotating, within the alignment sleeve, one ferrule with respect to the other, until maximum coupling is observed.

Central to a so-called prealigned rotary splice is the recognition that eccentricity between ferrule passageway and ferrule cylindrical surfaces essentially will have no effect on alignment of fibers terminated by two ferrules if the two ferrules have essentially the same amount of passageway eccentricity relative to the cylindrical surfaces and if the ferrules are aligned such that the eccentricities are in the same radial direction from centroidal axes of the ferrules or are in the same quadrant.

Another popular optical fiber connector is one known as the SC connector. An SC connector includes a ferrule assembly which includes a barrel having a collar at one end and an optical fiber terminating ferrule projecting from the barrel. The ferrule assembly is disposed in a plug frame such that an end portion of the ferrule projects from one end of the plug frame and a strength member retention portion of a cable retention member is disposed over the barrel projecting from the other end. The plug frame is configured so that it is polarized with respect to a grip into which the plug frame snap-locks. One grip is inserted into one end of a coupler housing and another grip is inserted into another end of the coupler housing to cause the ends of the ferrules to become disposed in optical connection with each other.

The foregoing assembly is made so that the direction of eccentricity of the ferrule passageway becomes aligned with a key disposed on an outer surface of the grip. In order to cause the direction of eccentricity to become aligned with the key, inasmuch as the plug frame can only be inserted in one orientation, the ferrule must be oriented with respect to the plug frame prior to its assembly therewith. This is a somewhat difficult task and consumes excessive time. Also, whereas the SC connector has a number of advantageous features, in its present form it is difficult to use to field-terminate optical fibers.

What is sought after and what seemingly is not available in the art is an SC ferrule connector in which the eccentricity of the ferrule fiber-receiving passageway is aligned with a key of a grip and in which the eccentricity of the passageway may be determined after the ferrule assembly has been assembled with another portion of the connector and/or after the ferrule assembly has been used to terminate an end portion of an optical fiber. The capability of delayed eccentricity determination should reduce the cost of such a connector and render it more marketable to a wider segment of the industry. Also, sought after is an SC connector which is easily used for field termination of optical fiber.

SUMMARY OF THE INVENTION

The foregoing problems of the prior art have been overcome by the connector of this invention. An optical fiber connector comprises a ferrule assembly including a ferrule portion having a passageway for an optical fiber, and a plug frame in which is disposed the ferrule assembly. In a preferred embodiment, the plug frame includes inwardly radially projecting, circumferentially spaced splines. The ferrule assembly is disposed in the plug frame such that grooves formed between segmented portions of said collar receive splines of the plug frame therebetween to prevent relative rotation between the ferrule assembly and the plug frame. The ferrule assembly includes a barrel portion which projects toward a latching end portion of the plug frame. A ferrule projects toward an opposite end portion of the plug frame which is destined to become disposed adjacent to the corresponding end of a plug frame of another connector. The opposite end portion of the plug frame is symmetrical with respect to a transverse cross section. Spring means is disposed about the portion of the ferrule assembly which projects toward the latching end portion of the plug frame. The connector also includes a cable retention member which includes a pocket for the spring and the barrel portion. The cable retention member effectively preloads the spring. The cable retention member includes outwardly projecting tabs each of which is received in a slot in the latching end portion of the plug frame to secure the cable retention member to the plug frame.

Because of the symmetry of the opposite end portion of the plug frame, the plug frame may be in any rotational orientation with respect to another portion of the connector, which is called a grip, when the two are assembled together. As a result, the ferrule assembly may be assembled with the plug frame after which the eccentricity of the optical fiber core or ferrule passageway may be determined with an appropriate marking made on the plug frame. Then the plug frame is assembled with the grip in such a way as to align the direction of eccentricity with a key of the grip. But for the symmetry, the direction of eccentricity would have to be determined first and the ferrule assembly assembled with the plug frame in a particular manner so that when the plug frame was assembled in the only possible orientation with the grip, the direction of eccentricity would be aligned with the key of the grip.

BRIEF DESCRIPTION OF THE DRAWING

Other features of the present invention will be more readily understood from the following detailed description of specific embodiments thereof when read in conjunction with the accompanying drawings, in which:

FIG. 2 is an exploded perspective view of portions of the connector of FIG. 1;

FIG. 3 is a side elevational view partially in section which shows the connector of FIG. 1 in an assembled state;

FIG. 4 is an elevational view of the assembled connector rotated 90° to the view of FIG. 3 to show a key of a grip in which portions of the connector are received;

FIG. 8 is an end view in section of the assembled connector of FIG. 3 showing portions of the grip latched into grooves of a plug frame to secure together portions of the connector; and FIG. 9 is an end view of the assembled connector of FIG. 8 with forces being applied to diagonally opposed corners thereof to cause disengagement of the latching portions of the grip with the plug frame.

DETAILED DESCRIPTION

Figure 1:
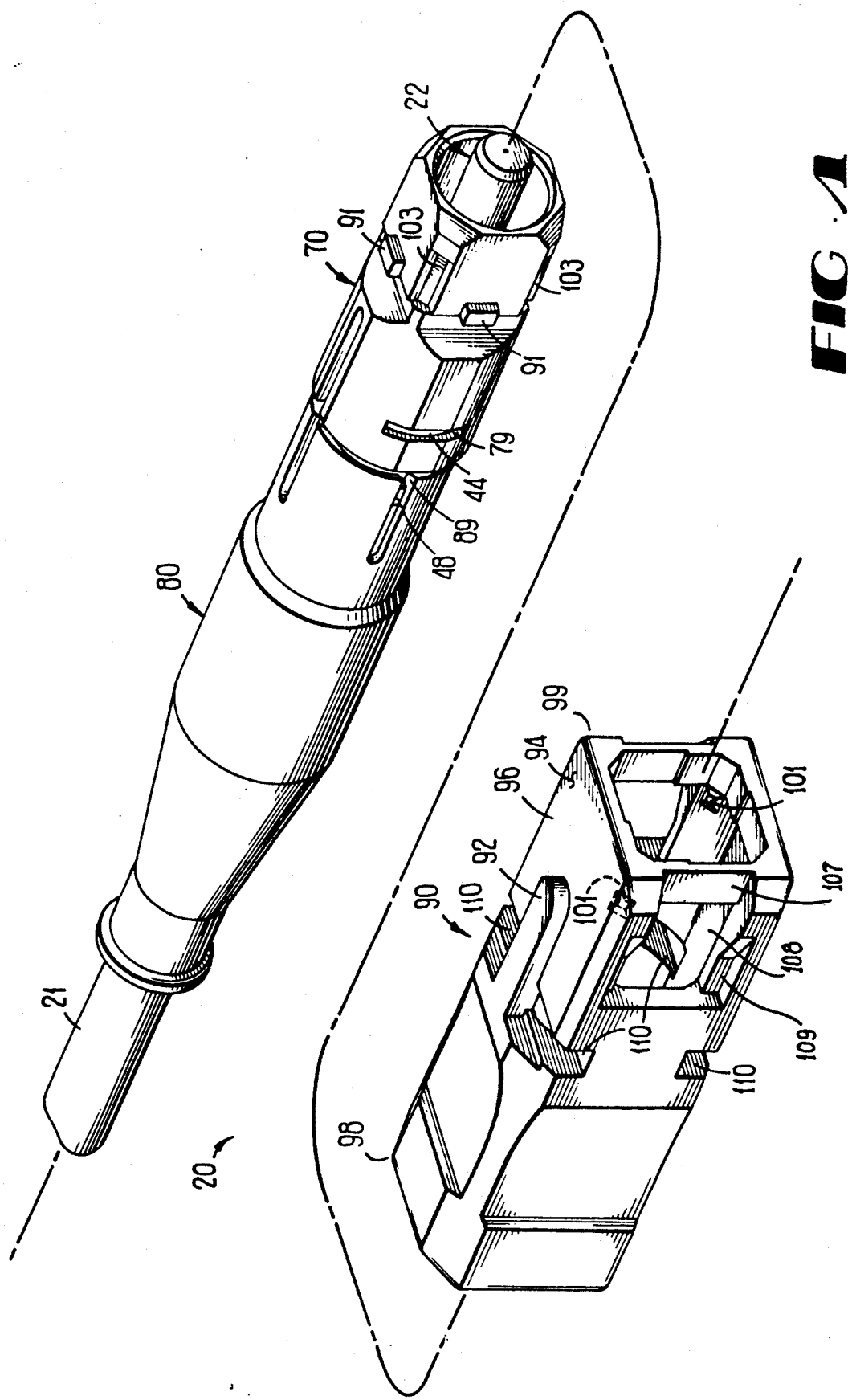
FIG. 1 is a partially exploded perspective view of a ferrule connector of this invention.

Referring now to FIG. 1, there is shown a connector which is designated generally by the numeral 20 which is adapted to terminate an optical fiber cable 21. The connector 20 comprises a ferrule assembly which is designated generally by the numeral 22. The ferrule assembly includes a barrel 24 (see also FIG. 2) having a segmented collar 26 at one end thereof. For the purpose of antirotation the collar 26 is provided with segments 28-28 with a groove 29 formed between each adjacent two of the segments. Four segments 28-28 are preferred but more or less could be used. Extending from a cavity in an opposite side of the collar 26 is a ferrule 30 which is made of a ceramic material, for example, and which has an optical fiber receiving passageway 32 formed along a longitudinal centerline axis thereof. Further, a free end of the ferrule 30 has a beveled portion 34 which facilitates insertion of the ferrule into an alignment device. In order to facilitate the insertion of one end portion of an optical fiber 35 (see also FIGS. 3 and 4) of the cable 21 to be terminated by the ferrule, the barrel includes a bore 36 which is aligned with the passageway in the ferrule and an entrance 37 to the ferrule passageway is funnel-shaped. For a buffered optical fiber, for example, the buffer layer extends to the entrance 37.

Adapted to be assembled with the ferrule assembly 22 are a spring 38 and cable retention member 40 (see also FIGS. 2-4). The cable retention member 40 is cylindrically shaped and includes a pocket portion 42 adapted to receive the barrel 24 and the spring 38 of the ferrule assembly. Projecting from an outer surface of the pocket portion 42 are circumferentially disposed tabs 44—44 which are useful for securing the cable retention member to another portion of the connector to be described hereinafter. Also, the cable retention member 40 includes a circumferential groove 45, collars 46 and 48 and a strength member retention portion 49. The strength member retention portion 49 is adapted to have strength members 47—47 included in a sheath system of a single optical fiber cable extend into engagement therewith.

Adapted to be assembled to the cable retention member 40 is a crimp portion 50 which includes a stepped cylindrical sleeve 52 having a small diameter portion 54 and a large diameter portion 56. The sleeve 52 is adapted to be crimped about an end portion of a single optical fiber cable to be terminated by the connector 20. A mandrel 58 includes a flange 59 and a tubular portion 61. An end portion of the cable 21 to be terminated with the mandrel 58 already preinserted is moved into the crimp portion 50 such that the tubular portion 61 becomes disposed inside the sheath of the cable. The flange 59 becomes disposed just outside the strength member retention portion 49 or to the left thereof as viewed in FIG. 3. After the optical fiber from the end portion of the cable has been extended into the ferrule assembly such that an end of the fiber extends from the ferrule, a craftsperson causes the sleeve portion 54 to be crimped about the cable and the sleeve portion 56 to be crimped about the strength members of the cable from which the jacket has been removed. The tubular portion 61 of the mandrel 58 acts as an anvil during the crimping action to prevent damage to the optical fiber. Strength members 47—47 of the cable such as aramid fiber strength members are disposed about the periphery of the cable retention member and become gripped between the portions 56 and the cable retention member 49 as a result of the crimping (see FIGS. 3 and 4).

Should the optical fiber cable be simply a buffered fiber 63 (see FIG. 5) with no strength members, then the crimp portion 50 is deemed unnecessary. In that arrangement, the optical fiber cable extends into the barrel portion 24 and the fiber 35 into the passageway 32.

The ferrule assembly 22, the spring 38, the cable retention member 40 and a plug frame which is designated generally by the numeral 70 are adapted to be assembled (see FIGS. 1 and 2) together in what may be referred to as a cable or optical fiber terminator portion of the connector. The cable or optical fiber terminator portion may be factory preassembled. Factory assembly saves time and assembly costs in the field.

The plug frame 70 may be made of a plastic material such as polycarbonate and includes a forward end portion 72 which is formed with four chamfers 74—74 one at each two intersecting surfaces 73—73. The forward end portion 72 which includes a cavity 75 having a circular cross section is integral with a rear end portion 76 which has a circular tubular configuration in a transverse cross-section. The rear end portion 76 includes two diametrically opposed longitudinally extending slots 78—78 and two circumferentially extending windows 79—79. The rear end portion 76 includes a bore 77 (see FIG. 4) for receiving the ferrules and which transitions through a tapered portion to the cavity 75. Each of a plurality of splines 81—81 (see FIG. 3) project radially inwardly from the inner surface of the plug frame. Projecting from each outer surface 73 adjacent to the junction with the rear end portion is a detent 91.

As should be apparent from FIG. 2, the forward end portion 72 of the plug frame 70 is symmetrical in a cross section transverse of the longitudinal axis of the plug frame. In the prior art connector, the leading end was unsymmetrical.

When the ferrule assembly 22 is assembled to the plug frame 70, the ferrule 30 is received in the forward end portion and the barrel 24 is received in the tubular end portion 76. Segmented portions of the ferrule assembly become disposed between the internally projecting splines 81—81. This prevents rotation of the ferrule assembly 22 relative to the plug frame 70. Furthermore, when the ferrule assembly and the cable retention member are assembled to the plug frame, the tabs 44—44 radially projecting from the pocket portion of the cable retention member snap-lock into the windows 79—79 of the plug frame to hold the cable retention member secured to the plug frame.

Then the craftsperson tests the cable terminator portion comprising the ferrule assembly 22, the spring 38, the plug frame 70 and the cable retention portion 40 to determine the direction of any eccentricity of the passageway 32 in the ferrule 30. After this has been determined, the craftsperson provides a marking or otherwise identifies such direction on the plug frame 70.

Then an end portion of a cable which is to be terminated by the connector 20 is prepared. An outer jacket is removed from an end portion to expose strength members 47—47 or to expose an optical fiber. Provisions are included for holding the end portion of the cable secured to the connector.

The connector 20 also is provided with a cable strain relief portion 80 (see FIGS. 1–4). The cable strain relief portion 80 includes a portion 82 which is flexible and includes a large diameter portion 83 and a small diameter portion 84 joined by a tapered portion 86. Projecting from the large diameter portion 83 is a rigid portion 87 which includes a plurality of segments 88—88 each having a hook-like end portion 89.

During the assembly of the strain relief portion 80 with other portions of the connector, the rigid portion 88 is moved over the crimp portion 50. Movement of the strain relief portion 80 is discontinued when the hook-like end portions 89—89 snap-lock into the circumferential groove 45 in the cable retention member 40.

Figure 6:
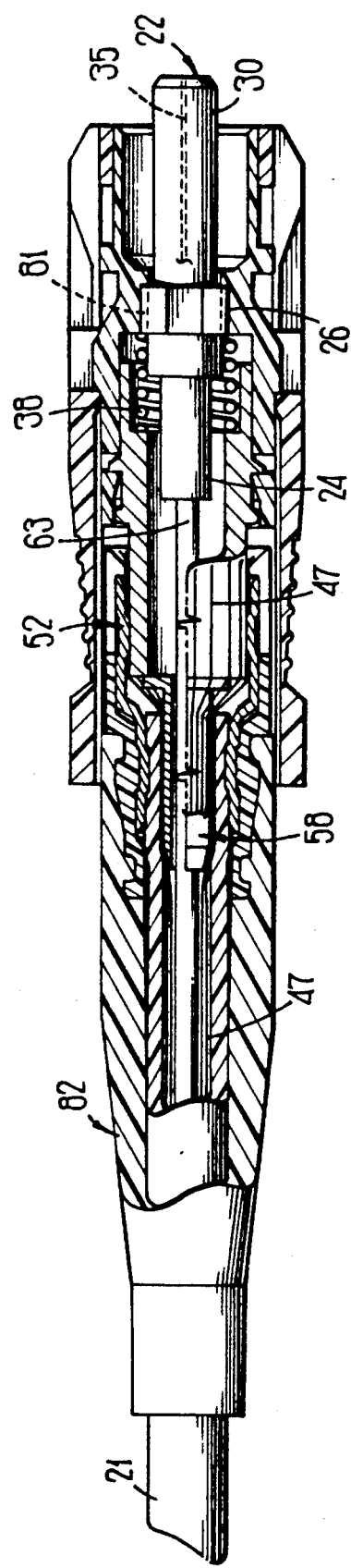
FIG. 6 is a side elevational view partially in section of a prior art connector.

This arrangement also is a departure from the prior art. In the prior art connector of FIG. 6, hook-like end portions of the rigid portion of the cable strain relief portion latch behind an end portion of the crimp portion 50 instead of in a groove of the cable retention member. Because the cable retention member is secured to the plug frame, the securing of the strain relief portion to the cable retention member provides a more integral structure. Also, advantageously the same elements of the connector 20 are used to secure the cable retention member to the plug frame in those instances when the transmission media structure being terminated does not include strength members and the crimp portion is not used.

Figure 5:
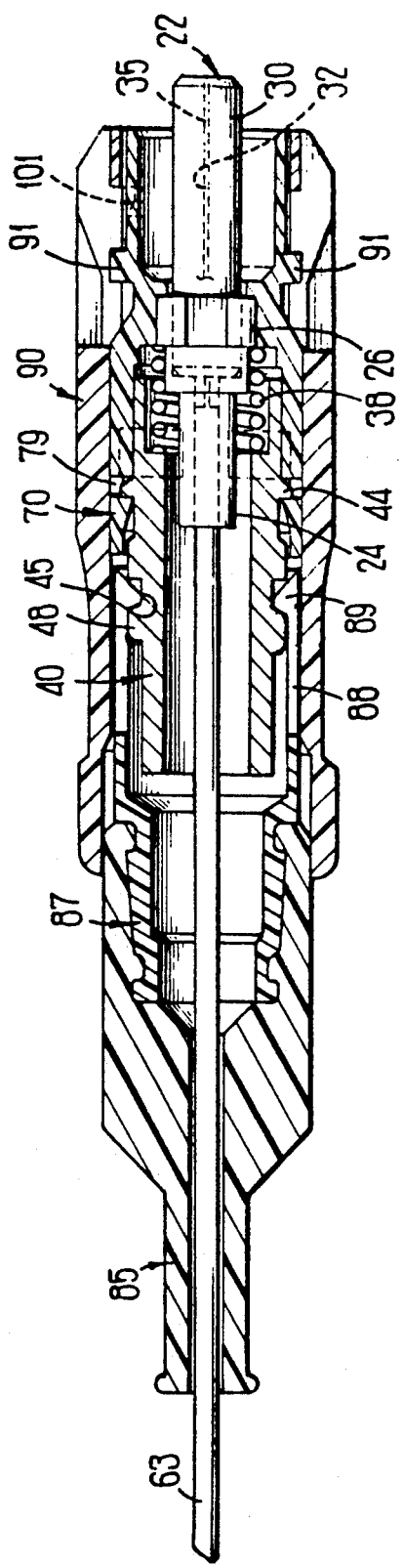
FIG. 5 is a side elevational view partially in section of a connector of this invention which is used to terminate a buffered optical fiber.

As will be recalled, FIG. 5 depicts a connector of this invention which is adapted to be used to terminate a buffered optical fiber instead of a cable. For such an embodiment, the strain relief portion 82 of FIGS. 3-4 is modified to have the configuration shown in FIG. 5 and designated with the numeral 85.

Then the craftsperson assembles the terminated cable comprising the cable 21, the strain relief portion 80, and the crimp portion 50 and the cable terminator with a grip which is designated generally by the numeral 90 (see FIG. 1). The grip and the plug frame assembly are configured so that the plug frame with the forward end portion 72 may be in any of four rotational orientations with respect to the grip and be assembled thereto. As will be recalled a forward end portion of the plug frame is symmetrical in a cross section normal to a longitudinal axis of the connector. The assembly is made so that the marking on the plug frame 70 is aligned with a key 92 projecting from an outer surface 94 of its grip. In this way, the key 92 is indicative of the direction of eccentricity of the plug passageway. By causing the direction of eccentricity of the plug passageway of one ferrule assembly to be in the same quadrant of another ferrule assembly to which it is optically connected, losses are reduced substantially. Of course, it should be understood that the direction of eccentricity could be that of the core of the optical fiber in which situation, the determination of eccentricity is made after the cable has been terminated by the cable terminator portion of the connector 20.

Such an arrangement is advantageous over the prior art. In a prior art SC connector (see FIG. 6), the terminated cable had to be in a predetermined orientation with respect to the grip 90 to enable assembly. Hence for the direction of eccentricity of the ferrule passageway or of the optical fiber core to be aligned with the key 92, the ferrule assembly had to be assembled to the plug frame such that the eccentricity was in a particular direction with respect to the plug frame. This required that the direction of eccentricity be determined prior to the assembly of the ferrule assembly to the plug frame. With the arrangement of this invention, the ferrule assembly is assembled to the plug frame after which the direction of eccentricity of the plug passageway or fiber core is determined. The direction of eccentricity can be determined before or after the optical fiber is disposed in the ferrule passageway.

It also should be mentioned that the arrangement of the segmented collar of the ferrule assembly 22 and the splines 81—81 can be used to cause the quadrant of eccentricity of the optical fiber core or passageway in the ferrule to be aligned with a particular spline which causes it to have a known orientation with respect to an outer portion of the plug frame.

As can be seen in the drawings, the grip 90 comprises an elongated plastic housing 96 having one end 98 (see FIG. 1) into which the plug frame assembly is inserted and an opposite end 99 which is adapted to be inserted into a coupling housing 100 (see FIG. 7) in order to facilitate an optical connection between two optical fibers terminated by two ferrule assemblies. The assembly is made to cause the key 92 of the grip to be received in a keyway 102 of the housing 100. A free end portion of a ferrule 30 is received in an alignment sleeve 105 (see FIG. 7). At its end 98, the housing 96 is formed with two locking nubs 101—101 formed in opposite internal corners. Each locking nub 101 is adapted to snap-lock into a groove 103 (see FIG. 2) along one of the chamfers 74—74 of the plug frame (see FIG. 8). This secures the plug frame to the grip. In order to disassemble the plug frame from the grip, a craftsperson need only squeeze the grip at opposite corners thereof (see FIG. 9). This causes the tabs to become disposed outside the grooves of the plug frame and allows the plug frame assembly to be withdrawn from the housing of the grip.

Figure 7:
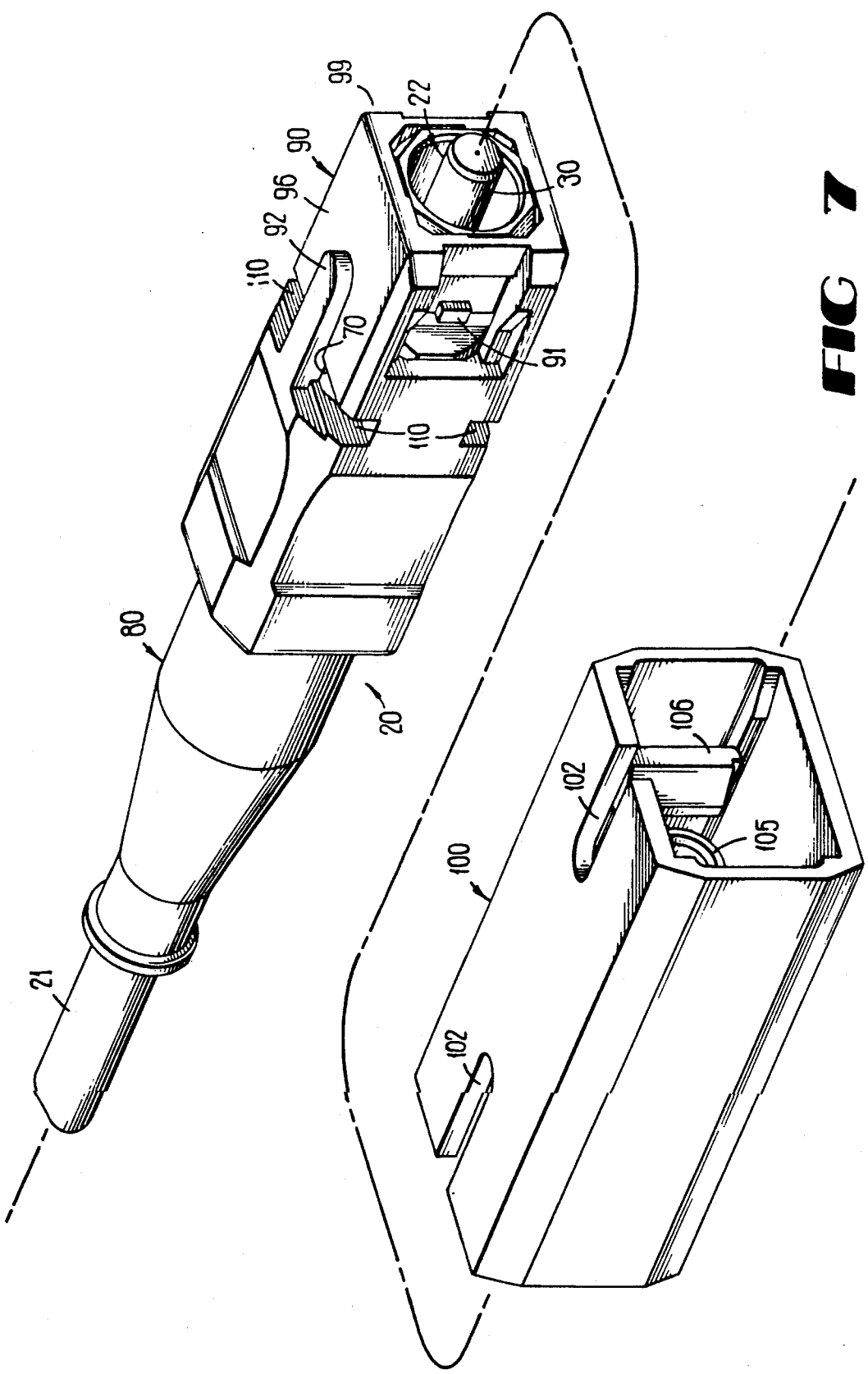
FIG. 7 is an exploded perspective view of the optical fiber connector of FIG. 1 and a coupling housing in which the optical fiber connector and another identical optical fiber connector are to be disposed.

As can be seen in FIG. 7, the coupling housing 100 is formed with two longitudinally aligned keyways 102—102. When two connectors 20—20 each including a grip are insterted into the housing with the keys aligned axially, the connectors become connected such that the quadrant direction of eccentricity of the ferrule passageways or fiber cores are aligned.

The connector also has provisions for becoming secured to the coupling housing 100. As will be recalled, each forward surface 73 of the plug frame 70 is formed with a detent 91 projecting therefrom. As is seen in FIG. 7, the near end of the coupling housing includes a depressible latching finger 106. A second latching finger 106 extends from an opposite wall but is not seen in FIG. 7. The far end of the coupling housing also is provided with a pair of opposed latching fingers. A connector 20 is inserted into the coupling housing until the latching fingers 106—106 associated with the end of the housing into which the connector is inserted ride past beams 107—107 which define openings 108—108 and along sidewalls 109—109 and snap-lock behind opposed detents 91—91 of the plug frame. Because the plug frame is provided with four such detents 91—91, the latching of the connector 20 to the coupling housing 100 can occur notwithstanding which of four orientations, 90° to one another, the plug frame is in relative to the coupling housing.

The configurations of the detents 91—91 and of the latching fingers 106—106 are such that upon the application of forces of a predetermined magnitude, typically on the order of about 2–4 lbs. to the grip 90 in a direction toward the cable 21, the latching fingers 106—106 are cammed up along the sidewalls 109—109 which causes the latching fingers to be spread apart to facilitate withdrawal of the connector 20 from the coupling housing 100.

Another feature of the connector 20 is shown in FIG. 7. The grip 90 is formed to include ports 110—110 which allow viewing of the plug frame 70 which may be a different color than that of the grip. During insertion of the grip 90 into a coupling housing 100, the non-visibility of the ports is indicative of full insertion of the grip into the coupling housing. This feature avoids the need to provide a secondary marking on the grip, the non-visibility of such serving the same function.

It is to be understood that the above-described arrangements are simply illustrative of the invention. Other arrangements may be devised by those skilled in the art which will embody the principles of the invention and fall within the spirit and scope thereof.

We claim:

1. An optical fiber connector, said connector comprising:
   a ferrule assembly including a ferrule portion having a passageway for an optical fiber, and a barrel;
   a plug frame in which is disposed said ferrule assembly, said barrel of said ferrule assembly projecting toward a latching end portion of said plug frame and said ferrule projecting toward an opposite end portion of said plug frame, said opposite end portion of said plug frame being symmetrical with respect to a cross section of said plug frame which is normal to a longitudinal axis of said connector;
   spring means disposed about said portion of said ferrule assembly which projects toward said latching end portion of said plug frame;
   a cable retention member which is assembled to said plug frame and which includes a pocket for said spring means and said barrel, said cable retention member including outwardly projecting tabs each of which is received in a slot in said latching end portion of said plug frame to secure said cable retention member to said plug frame, said cable retention means being effective to preload said spring means, and
   a housing in which said plug frame is disposed and which has a longitudinal axis, said plug frame capable of being assembled to said housing in any one of a plurality of rotational orientations with respect to the longitudinal axis of said connector.

2. The optical fiber connector of claim 1, which also includes a crimp portion which includes a sleeve which includes a large diameter portion which is capable of being crimped about a portion of said cable retention member with portions of a cable sheath system disposed between said large diameter portion of said crimp portion and said cable retention member and a small diameter portion which is capable of being crimped about a portion of a cable.

3. The optical fiber connector of claim 2, wherein said crimp portion includes a mandrel having a portion which becomes disposed in said large diameter portion of said sleeve, through which extends optical fibers of a cable being terminated and about which is disposed strength members of the cable so that the strength members may be secured between the large diameter portion of the sleeve and an outer surface of the cable retention member.

4. The optical fiber connector of claim 2, wherein a central portion of said cable retention member includes circumferentially extending tabs each of which is adapted to be received in an opening of said plug frame to secure said cable retention member to said plug frame.

5. The optical fiber connector of claim 4, wherein said connector comprises a grip which includes said housing and which includes a leading end portion having outer surfaces and a central cavity for receiving said plug frame assembly and a key projecting from one of the outer surfaces of the leading end portion of said housing, said opposite end portion of said plug frame including four outer orthogonal surfaces and being capable of being assembled to said grip such that any one of said outer surfaces of said opposite end portion of said plug frame is aligned with said key.

6. The optical fiber connector of claim 5, wherein said plug frame is assembled to said grip to cause the direction of any eccentricity of said passageway in said ferrule to be in the same quadrant as said key.

7. The optical fiber connector of claim 6, wherein said ferrule assembly includes a segmented collar with said barrel and said ferrule portion extending from opposite sides thereof, said plug frame including inwardly radially projecting, circumferentially spaced splines, said ferrule assembly being disposed in said plug frame such that grooves formed between segmented portions of said collar receive splines of said plug frame therebetween to prevent relative rotation between said plug frame and said ferrule assembly.

8. The optical fiber connector of claim 7, wherein two opposed inner portions of said grip of said leading end portion of said grip are provided with inwardly projecting latching nubs, said opposite end portion of said plug frame including a beveled surface at the intersection of each two outer surfaces of said opposite end portion of said plug frame, each said beveled surface being an invert of a groove formed by sidewalls which connect to said orthogonal surfaces of said opposite end portion of said plug frame, whereupon assembly of said plug frame to said housing of said grip, one of said latching nubs of said housing of said grip becomes disposed in one of said grooves and the opposed one of said latching nubs becomes disposed in a diagonally opposite one of said grooves.

9. The optical fiber connector of claim 8, wherein each of said orthogonal surfaces of said opposite end portion of said plug frame is provided with a detent and a leading end portion of said housing of said grip includes opposed walls and opposed openings, said assembly of said plug frame with said housing of said grip to cause said latching nubs of said grip to become disposed in two of said grooves of said plug frame and the assembly of said grip with a coupling housing causing latching fingers of said coupling housing to snap-lock behind each of two opposed detents to secure said connector to the coupling housing.

10. The optical fiber connector of claim 9, wherein the arrangement of said latching nubs and said grooves in said opposite end portion of said plug frame is such that the application of compressive forces to diagonally opposed outer corner portions of said housing of said grip which are aligned with said latching nubs causes disengagement of said latching nubs with said grooves and allows withdrawal of said plug frame from said grip.

11. The optical fiber connector of claim 9, which also includes a cable strain relief portion having a small diameter cable entry portion which transitions to a large diameter end portion which is adapted to be disposed about said crimp portion and connected to said cable retention member.

12. The optical fiber connector of claim 10, wherein said plug frame is adapted to be assembled to said housing of said grip when any one of said orthogonal surfaces of said opposite end portion of said plug frame is aligned with the outer surface of said housing of said grip which includes said key.

13. The optical fiber connector of claim 12, which is adapted to become assembled to a coupling housing with said passageway of said ferrule being aligned with a passageway of a ferrule of another such connector which is aligned coaxially therewith in the coupling housing.

14. A terminated optical fiber, which includes:
a length of optical fiber; and
an optical fiber connector which terminates said length of optical fiber, said optical fiber connector comprising:
a ferrule assembly including a ferrule portion having a passageway for an optical fiber, and a barrel;
a plug frame in which is disposed said ferrule assembly, said barrel of said ferrule assembly projecting toward a latching end portion of said plug frame and said ferrule projecting toward an opposite end portion of said plug frame, said opposite end portion of said plug frame being symmetrical with respect to a cross section of said plug frame which is normal to a longitudinal axis of said connector;
spring means disposed about said portion of said ferrule assembly which projects toward said latching end portion of said plug frame;
a cable retention member which is assembled to said plug frame and which includes a pocket for said spring means and said barrel portion, said cable retention member including outwardly projecting tabs each of which is received in a slot in said latching end portion of said plug frame to secure said cable retention member to said plug frame, said cable retention means being effective to preload said spring means; and
a housing in which said plug frame is disposed and which has a longitudinal axis, said plug frame capable of being assembled to said housing in any one of a plurality of rotational orientations with respect to the longitudinal axis of said connector.

15. The terminated optical fiber of claim 14, wherein a central portion of said cable retention member includes circumferentially extending tabs each of which is adapted to be received in an opening of said plug frame to secure said cable retention member to said plug frame.

16. The terminated optical fiber of claim 15, which also includes a grip which includes said housing in which said plug frame is disposed, said housing of said grip including a leading end portion which includes outer surfaces and which includes a central cavity for receiving said plug frame and a key projecting from one of said outer surfaces of said housing of said grip, said opposite end portion of said plug frame including four outer orthogonal surfaces and being capable of being assembled to said grip such that any one of said outer surfaces of said opposite end portion of said plug frame is aligned with said key.

17. The terminated optical fiber of claim 16, wherein said plug frame is assembled to said grip to cause the direction of eccentricity of said passageway in said ferrule to be in the same quadrant as said key.

18. The terminated optical fiber of claim 17, wherein two opposed inner portions of said grip of said leading end portion of said grip are provided with inwardly projecting latching nubs, said opposite end portion of said plug frame including a beveled surface at the intersection of each two surfaces of said opposite end portion of said plug frame, said beveled surface being an invert of a groove formed by sidewalls which connect to orthogonal surfaces of said opposite end portion of said plug frame, whereupon assembly of said plug frame to said housing of said grip, one of said latching nubs of said housing of said grip becomes disposed in one of said grooves and the opposed one of said latching nubs becomes disposed in a diagonally opposite one of said grooves.

19. An optical fiber connection, which includes: a coupling housing; and
two terminated optical fibers, each being a terminated optical fiber as set forth in claim 14.

20. The optical fiber connection of claim 19, wherein a central portion of said cable retention member includes circumferentially extending tabs each of which is adapted to be received in an opening of said plug frame to secure said cable retention member to said plug frame.

21. The optical fiber connection of claim 20, which also includes a grip which includes said housing in which said plug frame is disposed, said housing which includes outer surfaces and which includes a central cavity for receiving said plug frame assembly and a key projecting from one of said outer surfaces of a leading end portion of said housing of said grip, said opposite end portion of said plug frame including four outer orthogonal surfaces and being capable of being assembled to said grip such that any one of said outer surfaces of said opposite end of said plug frame is aligned with said key.

22. The optical fiber connection of claim 21, wherein said plug frame is assembled to said grip to cause the direction of eccentricity of said passageway in said ferrule to be in the same quadrant as said key.

23. The optical fiber connection of claim 22, wherein two opposed inner portions of said grip of said leading end portion of said grip are provided with inwardly projecting latching nubs, said opposite end portion of said plug frame including a beveled surface at the intersection of each two orthogonal surfaces of said opposite end portion of said plug frame, said beveled surface being an invert of a groove formed by sidewalls which connect to orthogonal surfaces of said opposite end portion of said plug frame, whereupon assembly of said plug frame to said housing of said grip, one of said latching nubs of said housing of said grip becomes disposed in one of said grooves and the opposed one of said latching nubs becomes disposed in a diagonally opposite one of said grooves.

24. The optical fiber connection of claim 23, wherein said grip is provided with ports spaced about the circumference of an intermediate portion thereof, said ports exposing the plug frame which is inserted into said grip, said ports of said grip being enclosed by said coupling housing when said grip is seated fully in said coupling housing.

25. The optical fiber connection of claim 24, wherein said coupling housing includes opposed latching fingers at each end portion thereof and said plug frame includes a detent disposed along each of said four outer orthogonal surfaces such that when said grip is inserted into one end of said coupling housing, the latching fingers associated with said one end of said housing are moved into openings in said housing of said grip and snap-lock behind detents of said plug frame to secure said grip to said coupling housing.

* * * * *